(12) United States Patent
Kim et al.

(10) Patent No.: US 11,555,581 B2
(45) Date of Patent: Jan. 17, 2023

(54) GAS DISCHARGE APPARATUS FOR LIQUEFIED HYDROGEN STORAGE TANKS

(71) Applicant: HYLIUM INDUSTRIES, INC., Gyeonggi-do (KR)

(72) Inventors: Seo Young Kim, Gyeonggi-do (KR); Jai Hyun Choi, Gyeonggi-do (KR); Eun Yeob Cho, Gyeonggi-do (KR); Joshua Kim Schimpf, Gyeonggi-do (KR)

(73) Assignee: HYLIUM INDUSTRIES, INC.

( * ) Notice: Subject to any disclaimer, the term of this patent is extended or adjusted under 35 U.S.C. 154(b) by 326 days.

(21) Appl. No.: 16/883,437

(22) Filed: May 26, 2020

(65) Prior Publication Data

US 2021/0285604 A1  Sep. 16, 2021

(30) Foreign Application Priority Data

Mar. 10, 2020 (KR) .................. 10-2020-0029697

(51) Int. Cl.
*F17C 7/04* (2006.01)
*F17C 13/04* (2006.01)
*F16K 31/528* (2006.01)
*F16K 31/60* (2006.01)

(52) U.S. Cl.
CPC .............. *F17C 7/04* (2013.01); *F17C 13/04* (2013.01); *F16K 31/5284* (2013.01); *F16K 31/60* (2013.01); *F17C 2205/0332* (2013.01); *F17C 2205/0394* (2013.01); *F17C 2221/012* (2013.01); *F17C 2223/0153* (2013.01); *F17C 2260/021* (2013.01); *F17C 2270/0168* (2013.01)

(58) Field of Classification Search
CPC .. F17C 7/04; F17C 13/04; F16K 1/306; F16K 31/5284; F16L 29/007
See application file for complete search history.

(56) References Cited

U.S. PATENT DOCUMENTS

| | | | | |
|---|---|---|---|---|
| 1,306,150 A | * | 6/1919 | Kessler ................ | B65D 25/385 222/509 |
| 2,620,817 A | * | 12/1952 | Blaydes ................ | F16K 1/306 251/290 |
| 5,018,552 A | * | 5/1991 | Politi .................... | B65D 47/02 222/147 |

(Continued)

*Primary Examiner* — Reinaldo Sanchez-Medina
(74) *Attorney, Agent, or Firm* — Mendelsohn Dunleavy, P.C.

(57) ABSTRACT

Disclosed is a gas discharge apparatus for liquefied hydrogen storage tanks, the gas discharge apparatus including a receptacle mounted to a liquefied hydrogen storage tank, the receptacle having a stationary valve configured to be opened by external force mounted therein, a multistage opening and closing device coupled to the receptacle such that the position of the multistage opening and closing device is adjustable, the multistage opening and closing device being configured to be opened by reaction force transmitted from the receptacle when moved relative to the receptacle, the multistage opening and closing device having a sliding valve configured to push open the stationary valve in the state in which the multistage opening and closing device is open, and a manipulation unit configured to move the multistage opening and closing device relative to the receptacle such that the sliding valve and the stationary valve are sequentially opened.

9 Claims, 6 Drawing Sheets

(56) References Cited

U.S. PATENT DOCUMENTS

| | | | | |
|---|---|---|---|---|
| 5,127,436 A | * | 7/1992 | Campion | ............... F17C 13/04 |
| | | | | 137/614.19 |
| 6,105,598 A | * | 8/2000 | Cabrera | ............... F17C 13/045 |
| | | | | 137/907 |
| 2009/0223580 A1 | * | 9/2009 | Denis | ...................... F17C 13/04 |
| | | | | 137/614.19 |

* cited by examiner

GAS DISCHARGE APPARATUS FOR LIQUEFIED HYDROGEN STORAGE TANKS

CROSS-REFERENCE TO RELATED APPLICATION

This application claims priority from Korean Patent Application No. 10-2020-0029697, filed on Mar. 10, 2020, in the Korean Intellectual Property Office, the disclosure of which is incorporated herein by reference in its entirety.

BACKGROUND OF THE INVENTION

1. Field of the Invention

The present invention relates to a gas discharge apparatus mounted to a liquefied hydrogen storage tank, and more particularly to a gas discharge apparatus for liquefied hydrogen storage tanks capable of discharging evaporated gas generated in a liquefied hydrogen storage tank, thereby guaranteeing safety.

2. Description of the Related Art

Hydrogen, which is a clean energy source, has an advantage in that little pollutant is generated upon combustion. As a result, hydrogen may be applied to various fields, and has attracted considerable attention as driving fuel of a moving means, such as a hydrogen vehicle or a drone, in recent years.

In order to more efficiently use hydrogen as fuel, it is important to develop technology capable of safely storing hydrogen. Although hydrogen can be stored in a gaseous or liquid state, it is advantageous to store hydrogen in a liquid state in terms of energy density and transportation efficiency. To this end, a liquefied hydrogen storage tank capable of withstanding ultra-low temperature and high pressure in order to store liquefied hydrogen has been developed.

Meanwhile, liquefied hydrogen stored in a liquefied hydrogen storage tank is naturally evaporated little by little for several reasons (e.g. the difference in temperature between the liquefied hydrogen and the open air). The evaporated hydrogen gas increases pressure in the liquefied hydrogen storage tank, whereby durability of the liquefied hydrogen storage tank is deteriorated. Depending on circumstances, the liquefied hydrogen storage tank may explode. Consequently, the hydrogen gas must be frequently discharged from the liquefied hydrogen storage tank in order to prevent pressure in the liquefied hydrogen storage tank from increasing excessively.

For this reason, a gas discharge apparatus is generally installed at the liquefied hydrogen storage tank. There are various kinds of conventional gas discharge apparatuses, and hydrogen gas is discharged from the liquefied hydrogen storage tank through the gas discharge apparatus, whereby safety is guaranteed.

Korean Patent Application Publication No. 10-2-17-0066871 discloses an evaporated gas discharge apparatus and method. The disclosed discharge apparatus is a mobile evaporated gas discharge apparatus for discharging evaporated gas generated in a liquefied hydrogen storage tank, wherein one end of the discharge apparatus is movable to an isolated evaporated gas zone, in which evaporated gas generated in the storage tank is collected, in order to discharge the evaporated gas in the isolated evaporated gas zone from the storage tank.

SUMMARY OF THE INVENTION

The present invention has been made in view of the above problems, and it is an object of the present invention to provide a gas discharge apparatus for liquefied hydrogen storage tanks configured such that the maximum value of ejected energy of gas is lowered when being opened, whereby safe treatment is achieved, such that great force is not necessary to perform opening, and such that blocking is also automatically performed by a spring.

In accordance with the present invention, the above and other objects can be accomplished by the provision of a gas discharge apparatus for liquefied hydrogen storage tanks, the gas discharge apparatus including a receptacle mounted to a liquefied hydrogen storage tank, the receptacle having a stationary valve configured to be opened by external force mounted therein, a multistage opening and closing device coupled to the receptacle such that the position of the multistage opening and closing device is adjustable, the multistage opening and closing device being configured to be opened by reaction force transmitted from the receptacle when moved relative to the receptacle, the multistage opening and closing device having a sliding valve configured to push open the stationary valve in the state in which the multistage opening and closing device is open, and a manipulation unit configured to move the multistage opening and closing device relative to the receptacle such that the sliding valve and the stationary valve are sequentially opened.

The receptacle may include a discharge pipe configured to open an inner space of the liquefied hydrogen storage tank to the outside and a connection tube fixed to an extending end of the discharge pipe, the connection tube defining an outflow channel configured to receive gas passing through the discharge pipe and to guide the received gas to the outside, the connection tube having a stationary valve provided in the outflow channel, the multistage opening and closing device may include an upward-downward movement housing having a rectilinear path located on a straight line of the outflow channel in the state of being coupled to the connection tube, the upward-downward movement housing having the sliding valve provided in the rectilinear path, and the sliding valve may be moved to the stationary valve in the state of being inserted in the outflow channel so as to be joined with the stationary valve and may be opened by reaction force from the stationary valve.

The stationary valve may include a valve case fixed in the outflow channel of the connection tube, the valve case having a valve path configured to allow gas to pass therethrough and a step portion formed in the valve path, a driven shutter installed in the valve path such that the position of the driven shutter is adjustable, the driven shutter having a valve stem extending in the longitudinal direction and an opening and closing disc formed integrally with the valve stem, the opening and closing disc being in tight contact with the step portion in order to block the valve path, and a spring installed in the valve path, the spring being configured to elastically support the opening and closing disc against the step portion such that the opening and closing disc blocks the valve path.

The sliding valve may include a main body formed so as to have a hollow pipe shape, the main body defining an in-body path configured to allow discharged gas to pass therethrough, a baffle plate located in the in-body path, the baffle plate having a through-hole configured to allow the discharged gas to pass therethrough, a valve body having an extension rod extending in the longitudinal direction, one end of the extension rod being fixed to the baffle plate, the extension rod being located on a straight line of the valve stem, and a blocking disc formed integrally with the extension rod, the blocking disc being formed so as to have a disc shape, a forward-rearward movement cylinder installed in the in-body path so as to be slidable, the forward-rearward movement cylinder having an opening and closing hole configured to allow the extension load to extend therethrough, the opening and closing hole being blocked by the blocking disc, and a spring configured to elastically support the forward-rearward movement cylinder against the valve case such that the opening and closing hole is blocked by the blocking disc in the state in which no external force is applied.

The forward-rearward movement cylinder may be formed so as to have a cylindrical shape configured to receive the blocking disc and a portion of the extension rod, the cylindrical shape having a predetermined length, and an end of the forward-rearward movement cylinder may abut the valve case such so as to receive reaction force from the valve case when the multistage opening and closing device is moved to the receptacle.

The connection tube may have a predetermined diameter, the connection tube being provided at the outer circumferential surface of an end thereof with a guide pin, the upward-downward movement housing may include a holder configured to receive the end of the connection tube, the holder having a predetermined diameter, and an extension portion formed integrally with the holder, the extension portion having the rectilinear path formed along a central axis thereof, and the holder may be provided with a support slit configured to receive the guide pin and to receive supporting force from the guide pine when the upward-downward movement housing is axially rotated in order to convert axial rotational force of the upward-downward movement housing into rectilinear movement force such that the upward-downward movement housing advances to and retreats from the stationary valve.

The support slit may be open to the outside of the holder through a pin entrance and exit portion, the support slit being formed to have a curved shape.

A first step recess and a second step recess may be disposed in the support slit so as to be spaced apart from each other, each of the first step recess and the second step recess being configured to allow the guide pin to stay therein, the valve body may be moved to the driven shutter in order to open the opening and closing hole while the guide pin enters the pin entrance and exit portion and reaches the first step recess, and the valve body may push the driven shutter such that the driven shutter is moved in order to open the stationary valve while the guide pin is moved from the first step recess to the second step recess.

The manipulation unit may include a handle fixed to the extension portion, the handle being configured to transmit rotational force applied from the outside to the upward-downward movement housing.

The receptacle may further have a pipe housing configured to receive the discharge pipe and to support the connection tube.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE PREFERRED EMBODIMENTS

Hereinafter, an embodiment of the present invention will be described in more detail with reference to the accompanying drawings.

A gas discharge apparatus for liquefied hydrogen storage tanks according to the present invention, which is configured to discharge evaporated gas generated in a liquefied hydrogen storage tank, basically includes a receptacle mounted to a liquefied hydrogen storage tank, the receptacle having a stationary valve configured to be opened by external force mounted therein, a multistage opening and closing device coupled to the receptacle such that the position of the multistage opening and closing device is adjustable, the multistage opening and closing device being configured to be opened by reaction force transmitted from the receptacle when moved relative to the receptacle, the multistage opening and closing device having a sliding valve configured to push open the stationary valve in the state in which the multistage opening and closing device is open, and a manipulation unit configured to move the multistage opening and closing device relative to the receptacle such that the sliding valve and the stationary valve are sequentially opened.

Figure 1:
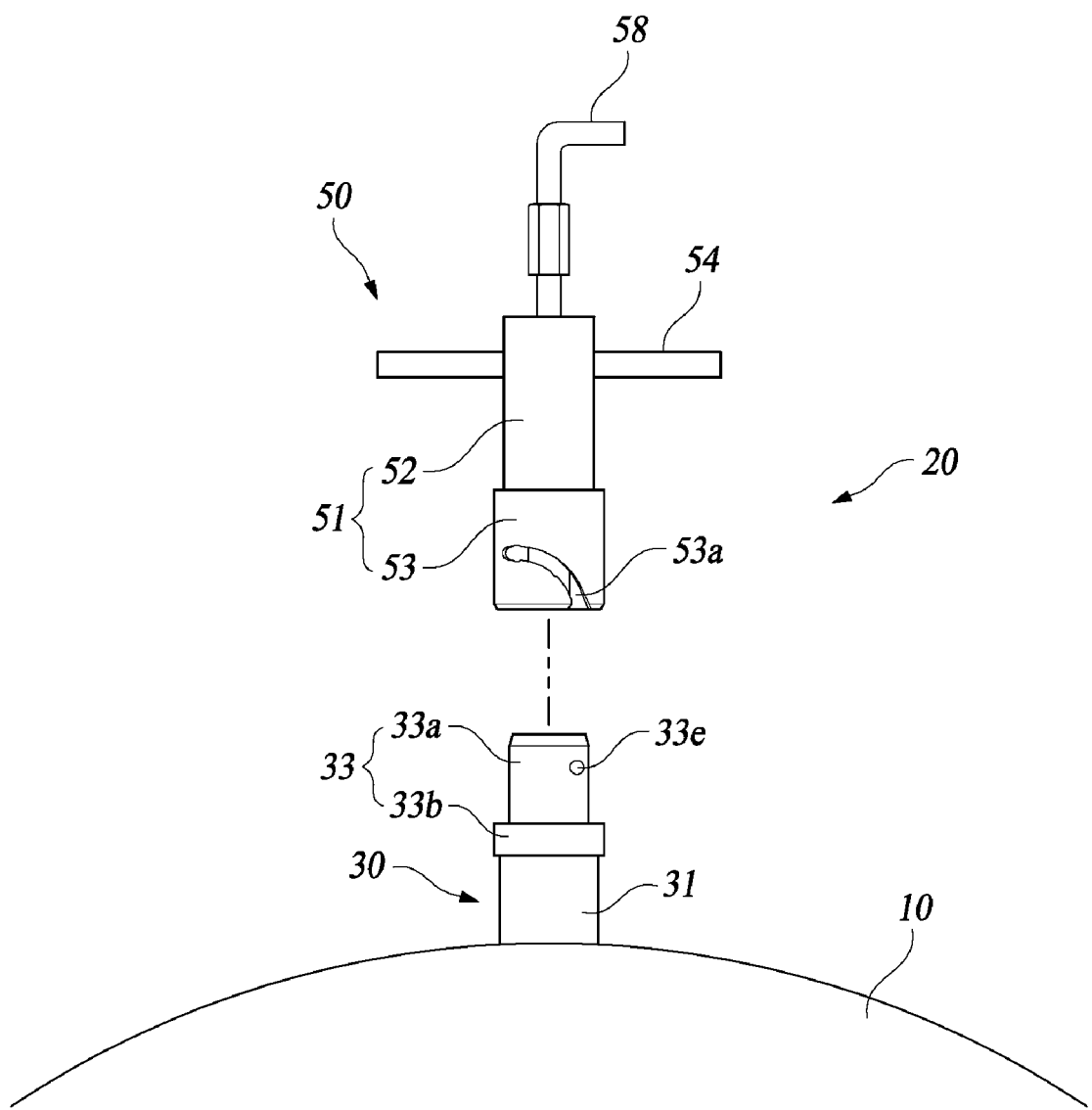
FIG. 1 is a view showing the basic structure of a gas discharge apparatus for liquefied hydrogen storage tanks according to an embodiment of the present invention.
Figure 2:
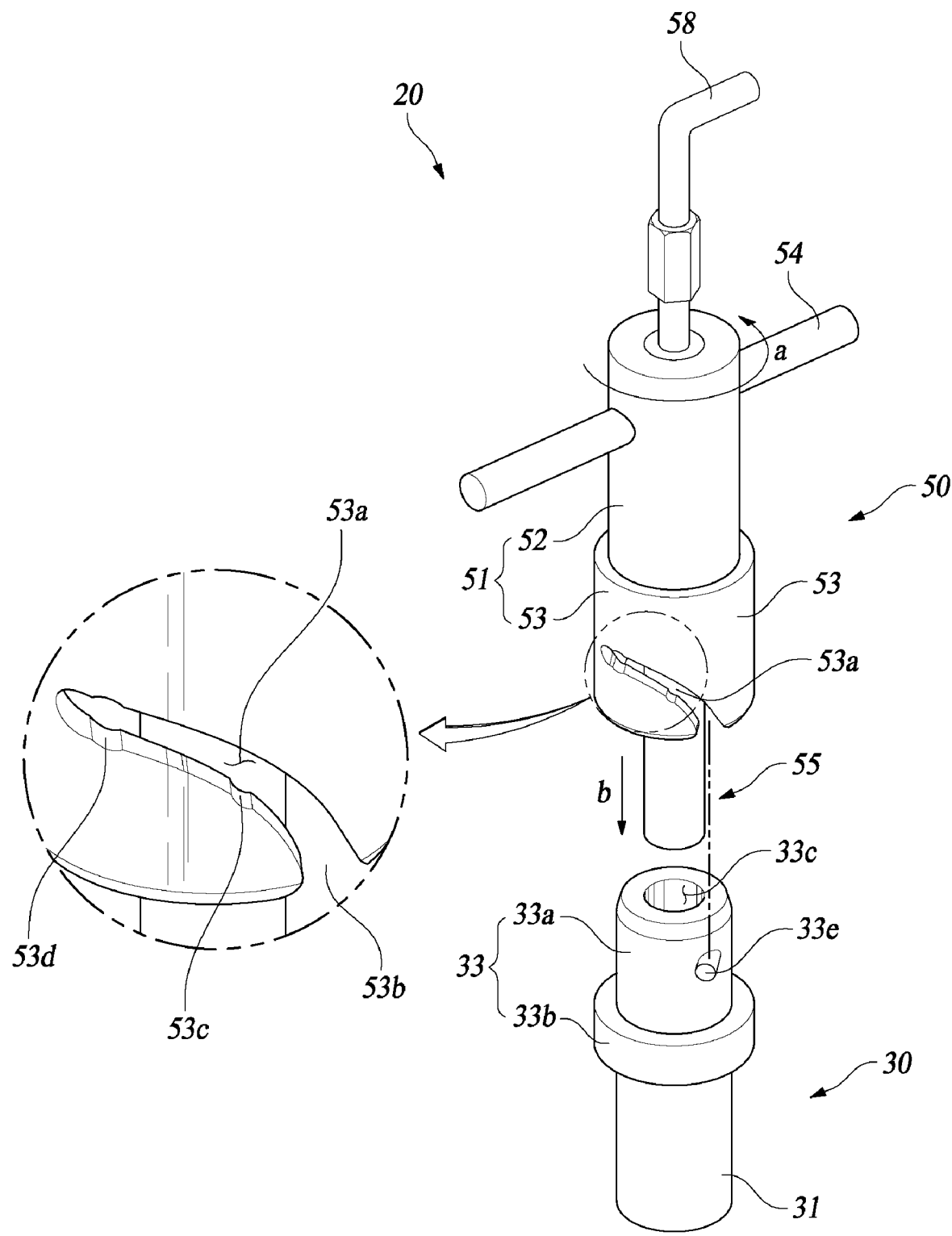
FIG. 2 is an exploded perspective view of the gas discharge apparatus for liquefied hydrogen storage tanks according to the embodiment of the present invention.
Figure 3:
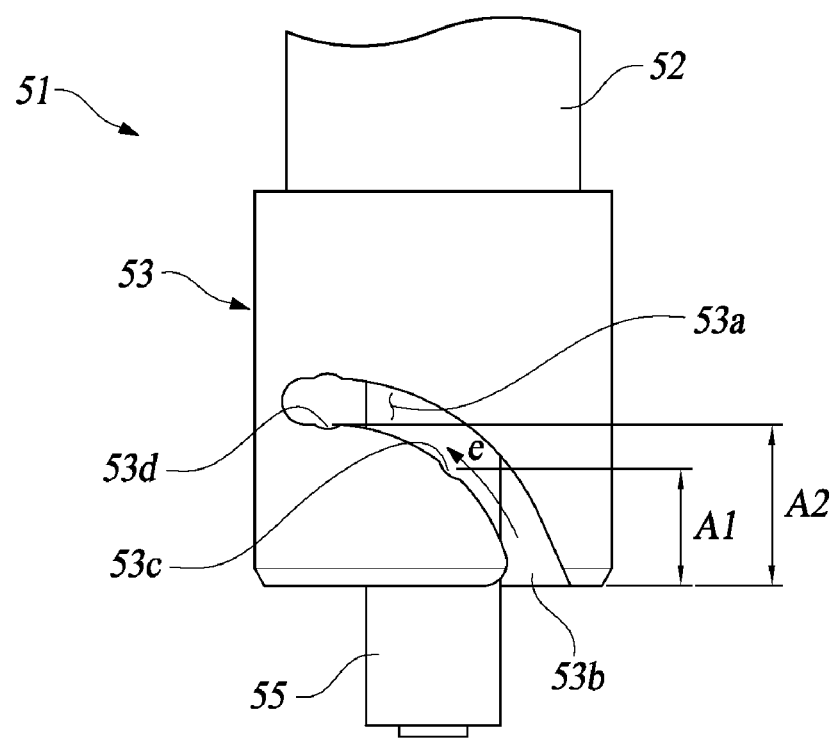
FIG. 3 is a side view of a holder shown in FIG. 2.

FIG. 1 is a view showing the basic structure of a gas discharge apparatus for liquefied hydrogen storage tanks according to an embodiment of the present invention. In addition, FIG. 2 is an exploded perspective view of the gas discharge apparatus for liquefied hydrogen storage tanks according to the embodiment of the present invention. FIG. 3 is a side view of a holder shown in FIG. 2.

As shown, the gas discharge apparatus for liquefied hydrogen storage tanks according to the embodiment of the present invention includes a receptacle 30 and a multistage opening and closing device 50.

The receptacle 30 is a structure fixed to a liquefied hydrogen storage tank 10, and has a stationary valve 41 (see FIG. 4) mounted therein. The stationary valve 41 is a constantly closed valve, and is opened by the multistage opening and closing device 50. As the stationary valve 41 is opened, gas is discharged from the liquefied hydrogen storage tank 10.

The multistage opening and closing device 50 has a sliding valve 55, and serves to discharge gas from the liquefied hydrogen storage tank 10 in the state of being mounted to the receptacle 30. When the multistage opening and closing device 50 is axially rotated in two stages in the state in which to the multistage opening and closing device 50 is mounted to the receptacle 30, the multistage opening and closing device 50 is moved to the receptacle 30 stepwise, whereby gas is discharged from the liquefied hydrogen storage tank 10.

The multistage opening and closing device 50 is connected to the receptacle 30 in order to discharge gas from the liquefied hydrogen storage tank 10, and remains separated from the receptacle 30 at ordinary times. A worker moves a liquefied hydrogen storage tank 10 required for gas to be discharged therefrom while holding the multistage opening and closing device 50, and connects the liquefied hydrogen storage tank 10 to a receptacle 30 of the liquefied hydrogen storage tank 10 in order to discharge gas from the liquefied hydrogen storage tank 10.

The gas discharged from the liquefied hydrogen storage tank 10 passes through the receptacle 30 and the multistage opening and closing device 50, and is then exhausted to the atmosphere via an extension tube 58. Depending on circumstances, a gas collection apparatus may be connected to the extension tube 58.

The receptacle 30 includes a discharge pipe 32 (see FIG. 4) fixed to the liquefied hydrogen storage tank 10, a pipe housing 31 configured to protect the discharge pipe 32 in the state of wrapping the discharge pipe 32, a connection tube 33 fixed to the upper end of the pipe housing 31, and a stationary valve 41 (see FIG. 4) mounted in the connection tube 33. The pipe housing 31 serves to protect the discharge pipe 32, and is coupled to the surface of the liquefied hydrogen storage tank 10 by welding.

The connection tube 33 includes an extension portion 33a having therein an outflow channel 33c configured to have a predetermined inner diameter, the extension portion 33a extending in the longitudinal direction, and a ring-shaped fixing portion 33b formed integrally at the outer circumferential surface of the extension portion 33a. The lower end of the connection tube 33 is hermetically connected to the end of the discharge pipe 32, whereby gas passes through the outflow channel 33c via the discharge pipe 32.

In addition, the fixing portion 33b is fixed to the upper end of the pipe housing 31. The fixing portion 33b may be fixed to the pipe housing 31 by welding or bolting. As the connection tube 33 is fixed to the pipe housing 31, the state of coupling between the connection tube 33 and the discharge pipe 32 may be stably maintained.

A guide pin 33e is located on the outer circumferential surface of the extension portion 33a. Although only a single guide pin 33e is shown in the figures, two guide pins 33e are provided so as to be spaced apart from each other by 180 degrees about the central axis of the extension portion 33a. The guide pin 33e is inserted into a support slit 53a of an upward-downward movement housing 51, and serves to rectilinearly move the upward-downward movement housing 51 in the direction indicated by arrow b when the upward-downward movement housing 51 is axially rotated in the direction indicated by arrow a.

The stationary valve 41 is a constantly closed valve mounted in the outflow channel 33c, prevents leakage of gas from the liquefied hydrogen storage tank 10, and is pushed open by the sliding valve 55, as will be described with reference to FIGS. 4 to 6. As the stationary valve 41 is opened, gas is discharged from the liquefied hydrogen storage tank 10. The stationary valve 41 has a structure shown in FIG. 4.

Figure 4:
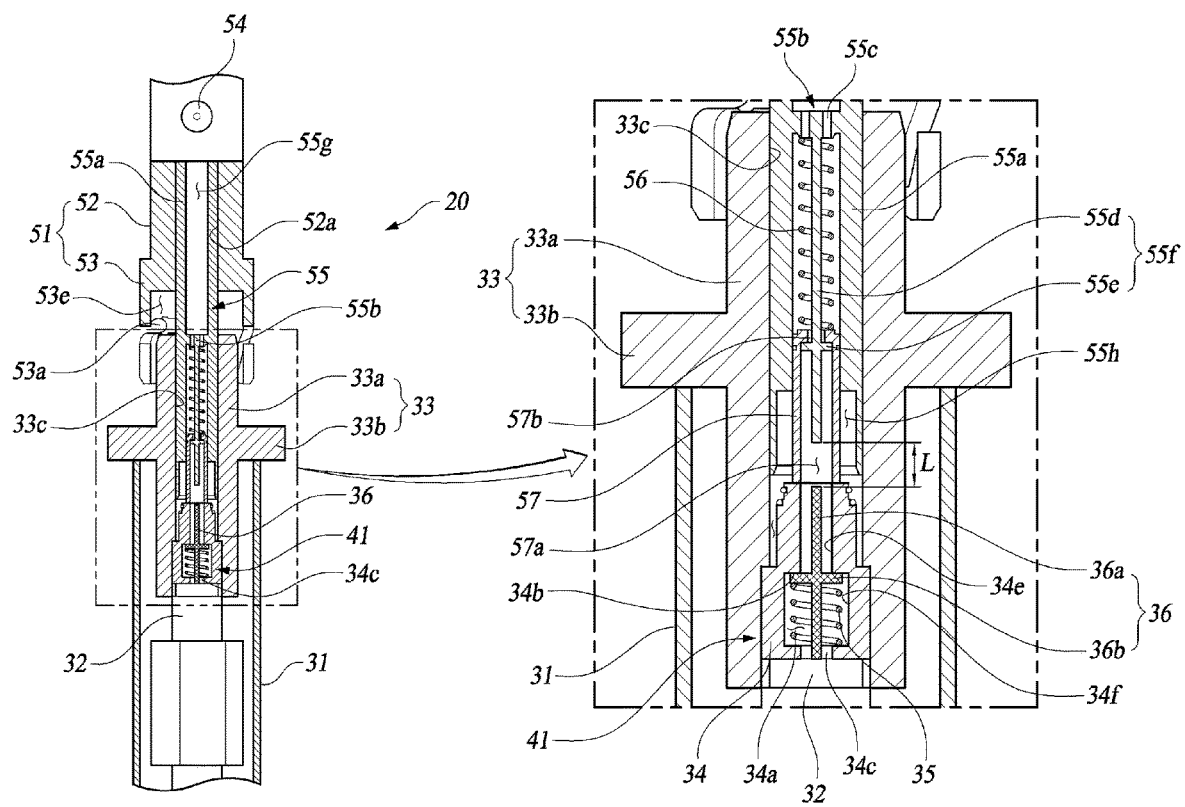
FIGS. 4 to 6 are sectional views illustrating the internal structure and operating principle of the gas discharge apparatus shown in FIG. 2.

As shown in FIG. 4, the stationary valve 41 includes a valve case 34, a driven shutter 36, and a spring 35.

The valve case 34 is a multistage cylindrical member fixed in the outflow channel 33c of the connection tube 33, and has a valve path 34a open in the vertical direction when viewed in the figure and a step portion 34b. The valve path 34a includes a small diameter portion 34e and a large diameter portion 34f. The small diameter portion 34e is a portion having a smaller inner diameter than the large diameter portion 34f. The large diameter portion 34f communicates with the discharge pipe 32 through a through-hole 34c.

The step portion 34b is a portion formed between the small diameter portion 34e and the large diameter portion 34f, and may be blocked by an opening and closing disc 36b.

The driven shutter 36 includes a valve stem 36a extending in the longitudinal direction and an opening and closing disc 36b formed integrally with the valve stem 36a. The valve stem 36a is a round bar-shaped member rectilinearly extending in the valve path 34a, and is located on the central axis of the outflow channel 33c. The opening and closing disc 36b is elastically supported by the spring 35 so as to be in tight contact with the step portion 34b in order to block the valve path 34a.

The spring 35 elastically supports the opening and closing disc 36b against the step portion 34b in the state of being mounted in the large diameter portion 34f of the valve path 34a. The opening and closing disc 36b is in tight contact with the step portion 34b as the result of action of the spring 35, whereby the valve path 34a is blocked. The valve path 34a is opened as the driven shutter 36 is pushed downwards by a valve body 55f, as shown in FIG. 6.

Referring back to FIGS. 1 to 3, the multistage opening and closing device 50 includes an upward-downward movement housing 51 and a sliding valve 55.

The upward-downward movement housing 51 has an extension portion 52 and a holder 53. The extension portion 52 is a cylindrical member having a rectilinear path 52a (see FIG. 4) formed along the central axis thereof, and the sliding valve 55 is fixed in the rectilinear path 52a.

The holder 53 is formed integrally with the extension portion 52, and has a connection tube reception space 53e configured to receive the upper part of the connection tube 33 therein. The connection tube reception space 53e may receive the upper part of the fixing portion 33b of the extension portion 33a.

In addition, a support slit 53a is formed in the holder 53. The support slit 53a is a curved slit extending upwards from the lower end of the holder 53 and gradually curved in the circumferential direction. When the upward-downward movement housing 51 is rotated in the direction indicated by arrow a in the state in which the guide pin 33e is inserted in the support slit 53a, the support slit 53a is pushed by the guide pin 33e, whereby the support slit 53a is moved downwards in the direction indicated by arrow b.

The lower end of the support slit 53a is a pin entrance and exit portion 53b. The guide pin 33e may be inserted into the support slit 53a, or may be separated from the support slit 53a, through the pin entrance and exit portion 53b. In addition, a first step recess 53c and a second step recess 53d are formed in the inside of the support slit 53a. The first step recess 53c and the second step recess 53d are recesses in which the guide pin 33e may stay.

The height A1 from the pin entrance and exit portion 53b to the first step recess 53c and the height A2 from the pin entrance and exit portion 53b to the second step recess 53d may be changed depending on design of the gas discharge apparatus, and the height A2 may be twice as large as the height A1.

Meanwhile, the multistage opening and closing device 50 may be moved relative to the receptacle 30 stepwise, i.e. step by step, by application of the first step recess 53c and the second step recess 53d. In other words, downward movement of the multistage opening and closing device 50 relative to the receptacle 30 is performed step by step.

A first step is a step of the guide pin 33e moving from the pin entrance and exit portion 53b to the first step recess 53c, and a second step is a step of the guide pin 33e moving from the first step recess 53c to the second step recess 53d. The multistage opening and closing device 50 is moved downwards toward the receptacle 30 by the distance A1 through the first step movement, and the multistage opening and closing device 50 is moved downwards toward the receptacle 30 by the distance A2 through the subsequent second step movement. As will be described later, the sliding valve 55 is opened at the time of the first step movement, and the stationary valve 41 is opened at the time of the second step movement. That is, the gas discharge apparatus 20 according to the embodiment of the present invention is not opened at once but is opened step by step in response to the step movement.

The lower end of the sliding valve 55 extends to the lower part of the holder 53 in the state in which the sliding valve 55 is received and fixed in the rectilinear path 52a of the extension portion 52. The lower end of the sliding valve 55 is moved downwards in the state of being inserted in the outflow channel 33c, and is then joined with the stationary valve 41, as shown in FIG. 4.

The internal structure of the sliding valve 55 is shown in FIG. 4.

Referring back to FIG. 4, the sliding valve 55 includes a main body 55a, a baffle plate 55b, a valve body 55f, a forward-rearward movement cylinder 57, and a spring 56.

The main body 55a is a hollow pipe type member that has a predetermined diameter and extends rectilinearly, and is fixed to the inner circumferential surface of the rectilinear path 52a. In addition, a case reception recess 55h is provided in the inner circumferential surface of the lower end of the main body 55a. The case reception recess 55h is a space configured to receive a portion of the valve case 34 in the state in which the multistage opening and closing device 50 is maximally moved downwards, as shown in FIG. 6.

The baffle plate 55b is formed integrally with the inner circumferential surface of an in-body path 55g, and has a plurality of through-holes 55c. The baffle plate 55b also serves as a support capable of supporting the spring 56 downwards.

The valve body 55f includes an extension rod 55d extending downwards in the longitudinal direction, one end of the extension rod 55d being fixed to the baffle plate 55b, and a blocking disc 55e formed integrally with the extension rod 55d. The extension rod 55d is a rectilinear round bar, and particularly is located on a straight line of the valve stem 36a. That is, the central axis of the extension rod 55d and the central axis of the valve stem 36a are aligned with each other. The blocking disc 55e is a disc-shaped portion having a predetermined thickness, and serves to block an opening and closing hole 57b of the forward-rearward movement cylinder 57.

The forward-rearward movement cylinder 57 is a cylindrical member installed in the in-body path 55g so as to be slidable, and has an opening and closing hole 57b formed in the upper end thereof when viewed in the figure. The opening and closing hole 57b is opened and closed by the blocking disc 55e. In addition, the lower end of the forward-rearward movement cylinder 57 abuts the valve case 34 before the first step movement.

The forward-rearward movement cylinder 57 having the above construction is elastically supported downwards by action of the spring 56. Since the blocking disc 55e is received in a space 57a, as shown in FIG. 4, the opening and closing hole 57b is blocked by the blocking disc 55e.

Meanwhile, a handle 54, as a manipulation unit, is fixed to the upward-downward movement housing 51. The handle 54 is configured such that a manager rotates the handle in the direction indicated by arrow a or in the opposite direction while holding the handle. The manipulation unit may be variously realized as long as the manipulation unit is capable of rotating the upward-downward movement housing 51.

Figure 5:
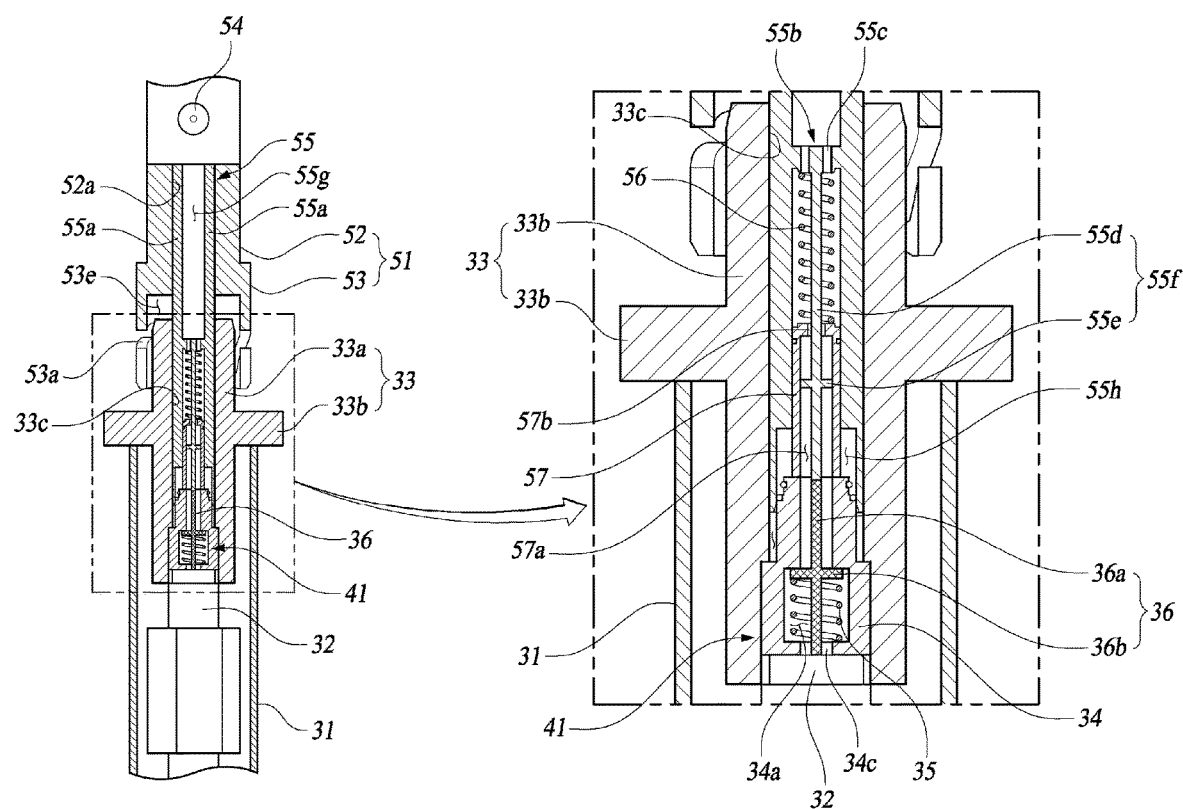
Figure 6:
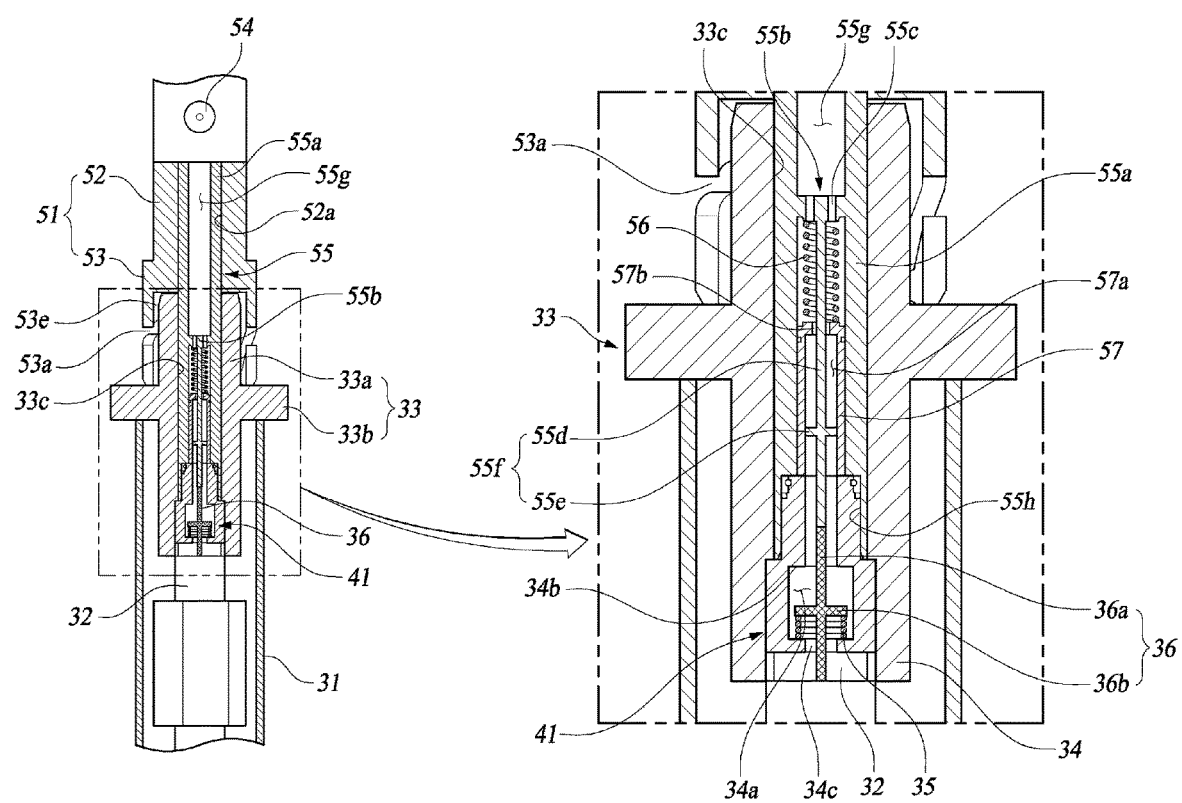

FIGS. 4 to 6 are sectional views illustrating the internal structure and operating principle of the gas discharge apparatus 20 shown in FIG. 2. FIG. 4 is a view showing the state before the first step movement, and FIG. 5 is a view showing the state after the first step movement. In addition, FIG. 6 is a view showing the state after the second step movement is completed.

Referring first to FIG. 4, it can be seen that the lower end of the forward-rearward movement cylinder 57 abuts the upper end of the valve case 34. At this time, the extension rod 55d and the valve stem 36a are spaced apart from each other by a distance L. Here, the distance L is equal to the height A1 of FIG. 3.

In the above state, the guide pin 33e is inserted into the pin entrance and exit portion 53b, and the upward-downward movement housing 51 is axially rotated in the direction indicated by arrow a of FIG. 2. As a result, the support slit 53a receives the guide pin 33e in the direction indicated by arrow e, and the upward-downward movement housing 51 starts to be moved downwards by supporting force of the guide pin 33e.

As the guide pin 33e reaches the first step recess 53c as the result of axial rotation of the upward-downward movement housing 51, the multistage opening and closing device 50 is moved downwards to the receptacle 30 by the distance L. Since the lower end of the forward-rearward movement cylinder 57 already abuts the valve case 34, however, portions other than the forward-rearward movement cylinder 57 are moved downwards. That is, as shown in FIG. 5, the extension rod 55d is moved downwards and then abuts the upper end of the valve stem 36a, and a portion of the upper end of the valve case 34 starts to be inserted into the case reception recess 55h. As a result, the opening and closing hole 57b is opened.

When the upward-downward movement housing 51 is further rotated to move the guide pin 33e to the second step recess 53d in the above state, the second step movement is achieved. That is, as shown in FIG. 6, the extension rod 55d pushes the valve stem 36a so as to be moved downwards. As a result, the driven shutter 36 is moved downwards, whereby the spring 35 is compressed, and the valve path 34a is opened. Consequently, the sliding valve 55 and the stationary valve 41 are sequentially opened.

As the stationary valve 41 and the sliding valve 55 are opened, as described above, gas in the liquefied hydrogen storage tank 10 is discharged outside via the receptacle 30 and the multistage opening and closing device 50.

In order to stop discharge of gas, the upward-downward movement housing 51 is rotated in the opposite direction. As the upward-downward movement housing 51 is rotated in the opposite direction, the stationary valve 41 is blocked, and then the sliding valve 55 is blocked. After blocking of the sliding valve 55 is completed, the multistage opening and closing device 50 is separated from the receptacle 30, and the gas discharge process is finished.

As is apparent from the above description, in the gas discharge apparatus for liquefied hydrogen storage tanks according to the present invention constructed as described above, the operation of opening the gas discharge pipe is performed in two stages. Consequently, the maximum value of ejected energy of gas is lowered when the gas discharge pipe is opened, whereby safe treatment is achieved.

In addition, the guide pin has a structure capable of moving along the curved support slit. Consequently, great force is not necessary to perform opening, and blocking is also automatically performed by action of the spring, whereby convenience in use is improved.

Although the present invention has been described in detail based on the concrete embodiment, those skilled in the art will appreciate that the present invention is not limited thereto and that various modifications, additions, and substitutions are possible without departing from the scope and spirit of the invention as disclosed in the accompanying claims.

What is claimed is:

1. A gas discharge apparatus for liquefied hydrogen storage tanks, the gas discharge apparatus comprising:
    a receptacle mounted to a liquefied hydrogen storage tank, the receptacle having a stationary valve configured to be opened by external force mounted therein;
    a multistage opening and closing device coupled to the receptacle such that a position of the multistage opening and closing device is adjustable, the multistage opening and closing device being configured to be opened by reaction force transmitted from the receptacle when moved relative to the receptacle, the multistage opening and closing device having a sliding valve configured to push open the stationary valve in a state in which the multistage opening and closing device is open; and
    a manipulation unit configured to move the multistage opening and closing device relative to the receptacle such that the sliding valve and the stationary valve are sequentially opened, wherein
    the receptacle comprises:
    a discharge pipe configured to open an inner space of the liquefied hydrogen storage tank to an outside; and
    a connection tube fixed to an extending end of the discharge pipe, the connection tube defining an outflow channel configured to receive gas passing through the discharge pipe and to guide the received gas to the outside, the connection tube having the stationary valve provided in the outflow channel,
    the multistage opening and closing device comprises an upward-downward movement housing having a rectilinear path located on a straight line of the outflow channel in a state of being coupled to the connection tube, the upward-downward movement housing having the sliding valve provided in the rectilinear path, and
    the sliding valve is moved to the stationary valve in a state of being inserted in the outflow channel so as to be joined with the stationary valve, and is opened by reaction force from the stationary valve.

2. The gas discharge apparatus according to claim 1, wherein the stationary valve comprises:
    a valve case fixed in the outflow channel of the connection tube, the valve case having a valve path configured to allow gas to pass therethrough and a step portion formed in the valve path;
    a driven shutter installed in the valve path such that a position of the driven shutter is adjustable, the driven shutter having a valve stem extending in a longitudinal direction and an opening and closing disc formed integrally with the valve stem, the opening and closing disc being in tight contact with the step portion in order to block the valve path; and
    a spring installed in the valve path, the spring being configured to elastically support the opening and closing disc against the step portion such that the opening and closing disc blocks the valve path.

3. The gas discharge apparatus according to claim 2, wherein the sliding valve comprises:
    a main body formed so as to have a hollow pipe shape, the main body defining an in-body path configured to allow discharged gas to pass therethrough;
    a baffle plate located in the in-body path, the baffle plate having a through-hole configured to allow the discharged gas to pass therethrough;
    a valve body having an extension rod extending in the longitudinal direction, one end of the extension rod being fixed to the baffle plate, the extension rod being located on a straight line of the valve stem, and a blocking disc formed integrally with the extension rod, the blocking disc being formed so as to have a disc shape;
    a forward-rearward movement cylinder installed in the in-body path so as to be slidable, the forward-rearward movement cylinder having an opening and closing hole configured to allow the extension load to extend therethrough, the opening and closing hole being blocked by the blocking disc; and
    a spring configured to elastically support the forward-rearward movement cylinder against the valve case such that the opening and closing hole is blocked by the blocking disc in a state in which no external force is applied.

4. The gas discharge apparatus according to claim 3, wherein
    the forward-rearward movement cylinder is formed so as to have a cylindrical shape configured to receive the blocking disc and a portion of the extension rod, the cylindrical shape having a predetermined length, and
    an end of the forward-rearward movement cylinder abuts the valve case such so as to receive reaction force from the valve case when the multistage opening and closing device is moved to the receptacle.

5. The gas discharge apparatus according to claim 3, wherein
    the connection tube has a predetermined diameter, the connection tube being provided at an outer circumferential surface of an end thereof with a guide pin,
    the upward-downward movement housing comprises a holder configured to receive the end of the connection tube, the holder having a predetermined diameter, and an extension portion formed integrally with the holder, the extension portion having the rectilinear path formed along a central axis thereof, and
    the holder is provided with a support slit configured to receive the guide pin and to receive supporting force from the guide pin when the upward-downward movement housing is axially rotated in order to convert axial rotational force of the upward-downward movement housing into rectilinear movement force such that the upward-downward movement housing advances to and retreats from the stationary valve.

6. The gas discharge apparatus according to claim 5, wherein the support slit is open to an outside of the holder through a pin entrance and exit portion, the support slit being formed to have a curved shape.

7. The gas discharge apparatus according to claim 6, wherein
    a first step recess and a second step recess are disposed in the support slit so as to be spaced apart from each other, each of the first step recess and the second step recess being configured to allow the guide pin to stay therein, the valve body is moved to the driven shutter in order to open the opening and closing hole while the guide pin enters the pin entrance and exit portion and reaches the first step recess, and the valve body pushes the driven shutter such that the driven shutter is moved in order to open the stationary valve while the guide pin is moved from the first step recess to the second step recess.

8. The gas discharge apparatus according to claim 5, wherein the manipulation unit comprises a handle fixed to the extension portion, the handle being configured to transmit rotational force applied from the outside to the upward-downward movement housing.

9. The gas discharge apparatus according to claim 1, wherein the receptacle further has a pipe housing configured to receive the discharge pipe and to support the connection tube.

* * * * *